(12) United States Patent
Chen

(10) Patent No.: US 12,423,257 B2
(45) Date of Patent: Sep. 23, 2025

(54) BRIDGE DEVICE AND DATA STORAGE SYSTEM

(71) Applicant: Silicon Motion, Inc., Hsinchu County (TW)

(72) Inventor: Chen-Hao Chen, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 4 days.

(21) Appl. No.: 17/884,551

(22) Filed: Aug. 9, 2022

(65) Prior Publication Data
US 2023/0169028 A1 Jun. 1, 2023

(30) Foreign Application Priority Data

Nov. 29, 2021 (TW) ................................ 110144404

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0026* (2013.01); *G06F 2213/0042* (2013.01)

(58) Field of Classification Search
CPC ............ G06F 13/4027; G06F 13/4282; G06F 2213/0026; G06F 2213/0042
See application file for complete search history.

(56) References Cited

U.S. PATENT DOCUMENTS

| | | | |
|---|---|---|---|
| 9,904,651 B2 | 2/2018 | Park | |
| 11,435,920 B2* | 9/2022 | Sela | G11C 16/26 |
| 11,842,069 B2* | 12/2023 | Zilberstein | G06F 3/0631 |
| 12,277,317 B2* | 4/2025 | Chen | G06F 3/0607 |
| 12,321,297 B2* | 6/2025 | Chen | G06F 13/1668 |
| 2016/0004294 A1* | 1/2016 | Stenfort | G06F 1/266 |
| | | | 713/310 |
| 2016/0070474 A1* | 3/2016 | Yu | G06F 12/0246 |
| | | | 711/103 |
| 2016/0070488 A1* | 3/2016 | Shaharabany | G06F 3/0611 |
| | | | 711/162 |
| 2016/0070493 A1 | 3/2016 | Oh | |
| 2016/0077994 A1* | 3/2016 | Hamada | G06F 13/4022 |
| | | | 710/313 |
| 2016/0320823 A1* | 11/2016 | Gerber | G06F 13/385 |
| 2018/0096711 A1* | 4/2018 | Seo | G11C 5/14 |
| 2019/0065080 A1* | 2/2019 | Tanpairoj | G06F 12/0246 |
| 2019/0114276 A1* | 4/2019 | Hodes | G06F 13/4027 |
| 2019/0121755 A1* | 4/2019 | Yang | G06F 11/1012 |

(Continued)

FOREIGN PATENT DOCUMENTS

| | | |
|---|---|---|
| TW | 200931422 | 7/2009 |
| TW | 201123641 A1 | 7/2011 |

(Continued)

*Primary Examiner* — Steven G Snyder
*Assistant Examiner* — Christopher A Bartels
(74) *Attorney, Agent, or Firm* — Winston Hsu

(57) ABSTRACT

A bridge device includes a first controller and a second controller. The first controller includes a first transmission interface. The second controller is coupled to the first controller and includes a second transmission interface coupled to the first transmission interface. The first transmission interface and the second transmission interface are both flash memory interface.

6 Claims, 5 Drawing Sheets

(56) References Cited

U.S. PATENT DOCUMENTS

| | | | | |
|---|---|---|---|---|
| 2019/0138440 A1* | 5/2019 | Lee | ................ | G06F 3/0679 |
| 2020/0225867 A1* | 7/2020 | Lee | ................ | G06F 3/0679 |
| 2020/0226058 A1* | 7/2020 | Lee | ................ | G06F 12/1009 |
| 2021/0216223 A1* | 7/2021 | Noh | ................ | G06F 1/04 |
| 2022/0269629 A1* | 8/2022 | Pinto | ................ | G06F 13/387 |
| 2023/0120862 A1* | 4/2023 | Gao | ................ | G06F 3/0679 |
| | | | | 711/154 |
| 2023/0237303 A1* | 7/2023 | Fan | ................ | H04B 1/3816 |
| 2023/0367490 A1* | 11/2023 | Shiau | ................ | G06F 3/0632 |
| 2024/0126622 A1* | 4/2024 | Vasudevan | ................ | G06F 9/542 |
| 2024/0378162 A1* | 11/2024 | Chen | ................ | G06F 13/382 |

FOREIGN PATENT DOCUMENTS

| | | |
|---|---|---|
| TW | I432960 B | 4/2014 |
| TW | 201435602 A | 9/2014 |
| TW | I590056 B | 7/2017 |

* cited by examiner

BRIDGE DEVICE AND DATA STORAGE SYSTEM

BACKGROUND OF THE INVENTION

1. Field of the Invention

The invention relates to a bridge device for connecting a data storage device, more particularly to a bridge device capable of combining high-speed transmission interfaces made by different processes or in compliance with different standards, to assist a host device to access a data storage device and to make the bridge device backward compatible.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives (SSD), Embedded Multi Media Cards (eMMC) and Universal Flash Storage (UFS)—have been used widely for a variety of purposes.

Generally, a host device has to access a data storage device through a transmission interface that conforms to the corresponding standard of the data storage device. If the host device itself does not have a transmission interface that can support the standard of the data storage device, the data storage device should be accessed through a specific bridge device. In order to achieve better performance as well as to save the manufacturing costs, data storage devices are usually developed by using the latest process or the latest standard along with the evolution of the process and/or the evolution of the corresponding standard of the transmission interface. However, there may be no bridge device that can support the latest process or the latest standard at the same time while the data storage devices are manufacturing, resulting in a problem that the host device cannot access and/or authenticate the newly developed data storage device through the existing bridge device.

To solve this problem, a bridge device capable of combining high-speed transmission interfaces made by different processes or in compliance with different standards is required, so as to assist a host device to access a data storage device and to make the bridge device backward compatible.

SUMMARY OF THE INVENTION

It is an objective of the invention to provide a novel design of a bridge device to solve the problem that the conventional bridge devices are unable to have different high-speed transmission interfaces made by different processes or in compliance with different standards. The proposed bridge device is capable of combining high-speed transmission interfaces made by different processes or in compliance with different standards, so as to assist a host device to access a data storage device and to make the bridge device backward compatible.

According to an embodiment of the invention, a bridge device comprises a first controller and a second controller. The first controller comprises a first transmission interface. The second controller is coupled to the first controller and comprises a second transmission interface coupled to the first transmission interface. The first transmission interface and the second transmission interface are both a flash memory interface.

According to an embodiment of the invention, a bridge device comprises a first memory controller and a second memory controller. The first memory controller comprises a first transmission interface. The second memory controller comprises a second transmission interface coupled to the first transmission interface. The first transmission interface and the second transmission interface are both a flash memory interface, the first memory controller and the second memory controller communicate with each other through the first transmission interface and the second transmission interface. The first memory controller further comprises a third transmission interface configured to communicate with a host device. The second memory controller further comprises a fourth transmission interface configured to communicate with a data storage device.

According to an embodiment of the invention, a data storage system comprises a bridge device and a data storage device. The bridge device comprises a first controller and a second controller coupled to the first controller. The data storage device comprises a third controller coupled to the second controller. The bridge device is coupled between the data storage device and a host device for transmitting data and signals between the data storage device and the host device, the second controller is a memory controller operating in a host mode and the third controller is a memory controller operating in a device mode.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
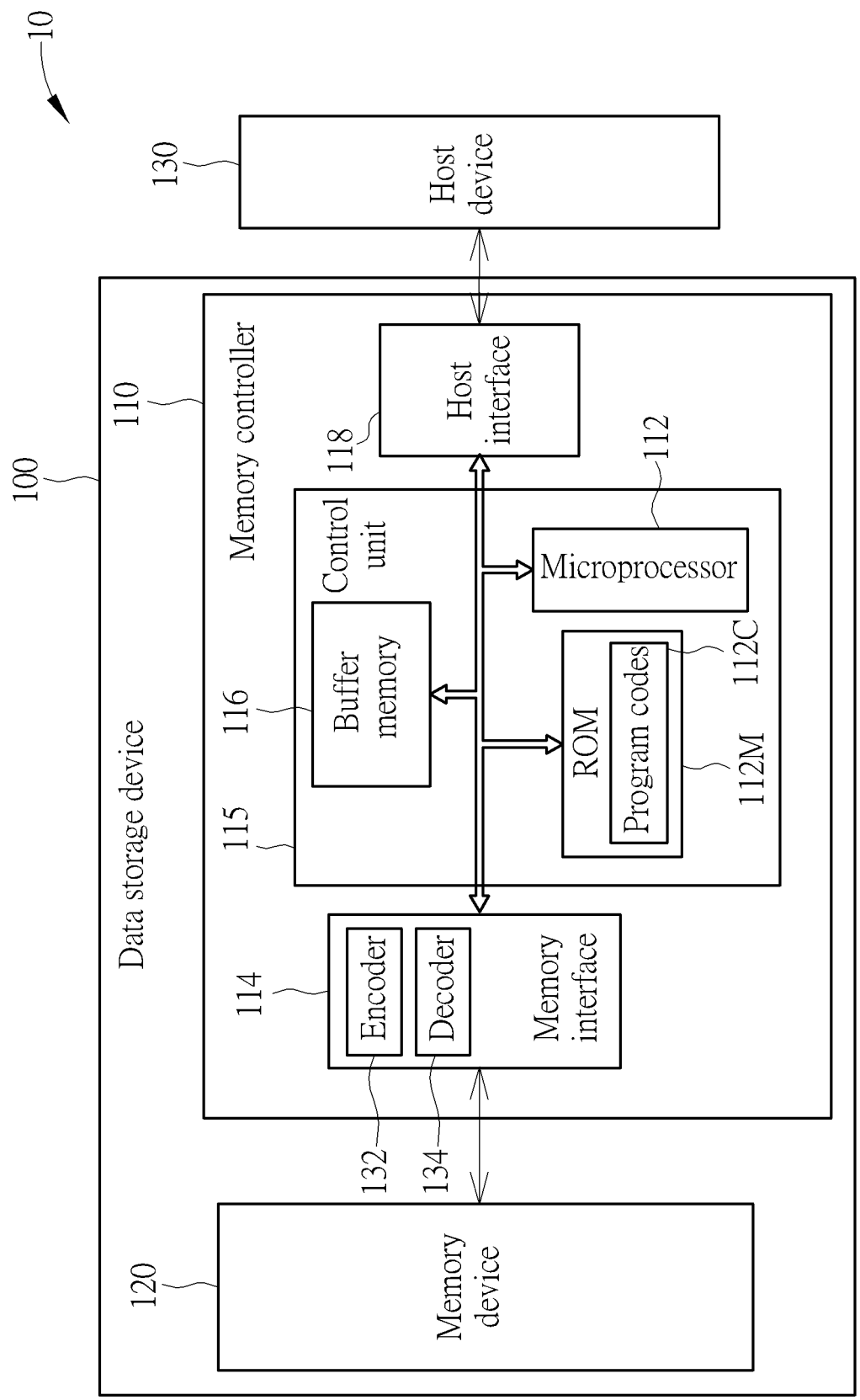
FIG. 1 is an exemplary block diagram of a data storage device according to an embodiment of the invention.

FIG. 1 is an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The microprocessor 112, the ROM 112M and the buffer memory 116 may form a control unit 115 of the memory controller 110. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured to decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

Figure 2:
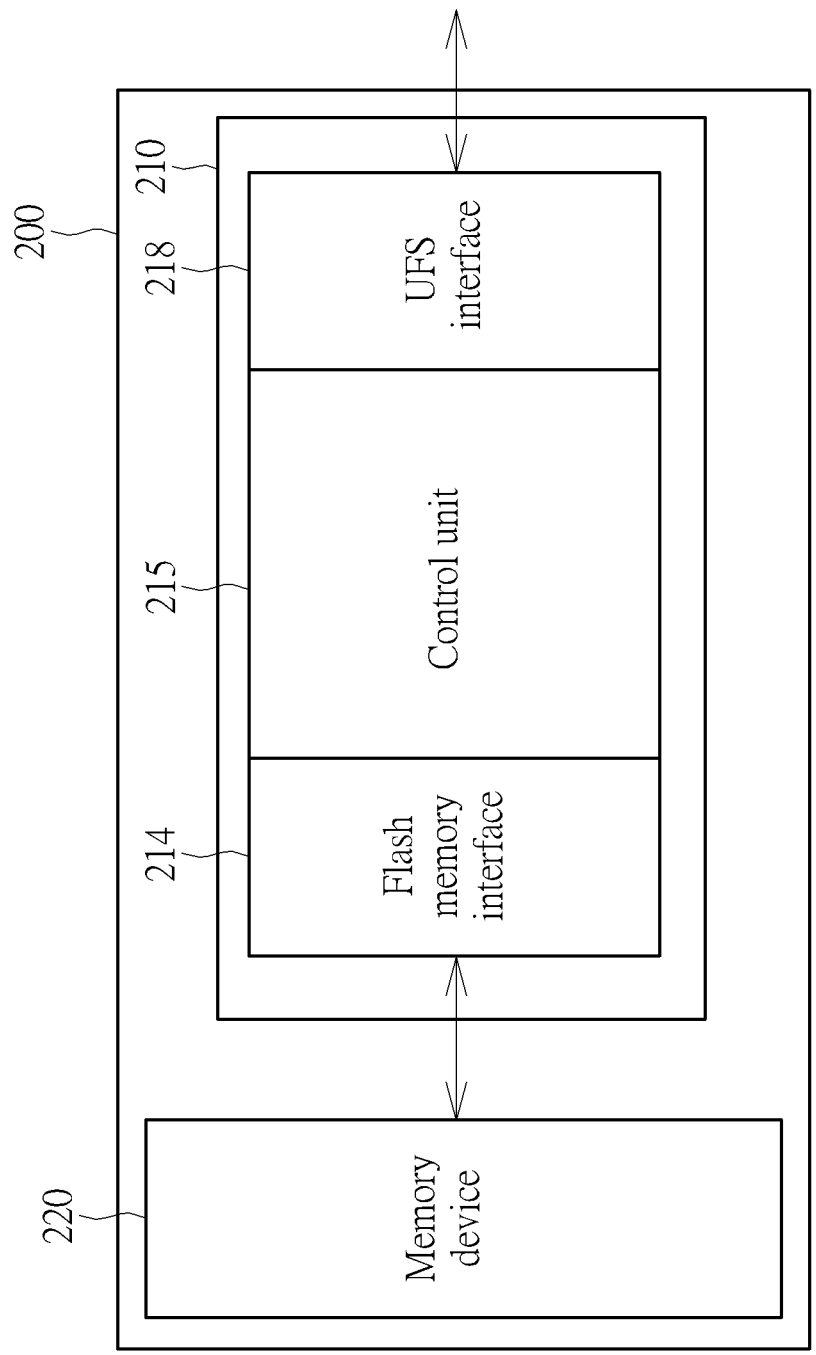
FIG. 2 is a simplified block diagram of a data storage device according to an embodiment of the invention.

FIG. 2 is a simplified block diagram of a data storage device according to an embodiment of the invention, wherein the components inside the memory controller are simplified into three parts: the host interface, the memory interface and the control unit, so as to simplify the description in the following paragraphs. As shown in FIG. 2, the data storage device 200 may comprise a memory device 220 and a memory controller 210. The memory controller 210 may access the memory device 220 and control operations of the memory device 220. The memory controller may be a non-volatile (NV) memory device, such as the above-mentioned flash memory.

In an embodiment of the invention, the memory device 220 may be a NAND type flash memory and the data storage device 200 may be implemented as an UFS device. Therefore, in this embodiment, the memory controller 210 may comprise an UFS interface 218, a flash memory interface 214 and a control unit 215. The UFS interface 218 may be the aforementioned host interface and the flash memory interface 214 may be the aforementioned memory interface. The control unit 215 may comprise a microprocessor, a ROM, a buffer memory as shown in FIG. 1. The control unit 215 may communicate with a host device (not shown in FIG. 2) through the UFS interface 218 and in compliance with the UFS protocol, and the control unit 215 may access the memory device 220 through the flash memory interface 214.

As discussed above, when a host device is equipped with a transmission interface supporting the corresponding standard of the data storage device 100/200, the host device may directly access the data storage device 100/200 through the transmission interface. When the host device is not equipped with any transmission interface supporting the corresponding standard of the data storage device 100/200, the data storage device 100/200 must be accessed through a specific bridge device.

However, when the data storage devices 100/200 are developed by using the latest process or the latest standard along with the evolution of the process or corresponding standard of the transmission interface, there may be no bridge device that can support the latest process or the latest standard at the same time while the data storage devices are manufacturing, or the bridge device may not be able to simultaneously comprise different high-speed transmission interfaces that are made by different processes or standards, resulting in the problem that the host device cannot access and/or authenticate the newly developed data storage device through the existing bridge device. In addition, when the host device is equipped with the transmission interface supporting the latest standard, the host device may be still unable to access the device that is not equipped with any transmission interface supporting the latest standard. As an example, according to the definition in the UFS standards, the versions of UFS 3.1 and UFS 3.0 are not compatible with each other because they respectively define the descriptor with different lengths. If a host device is a host platform adopting the UFS 3.1 standard, the corresponding device must use the firmware in compliance with the UFS 3.1 standard, otherwise there will be differences in compatibility, which will cause the host device unable to operate the device correctly, and vice versa. To solve this problem, a bridge device capable of combining high-speed transmission interfaces made by different processes or in compliance with different standards is proposed, so as to assist a host device to access a data storage device and to make the bridge device backward compatible.

Figure 3:
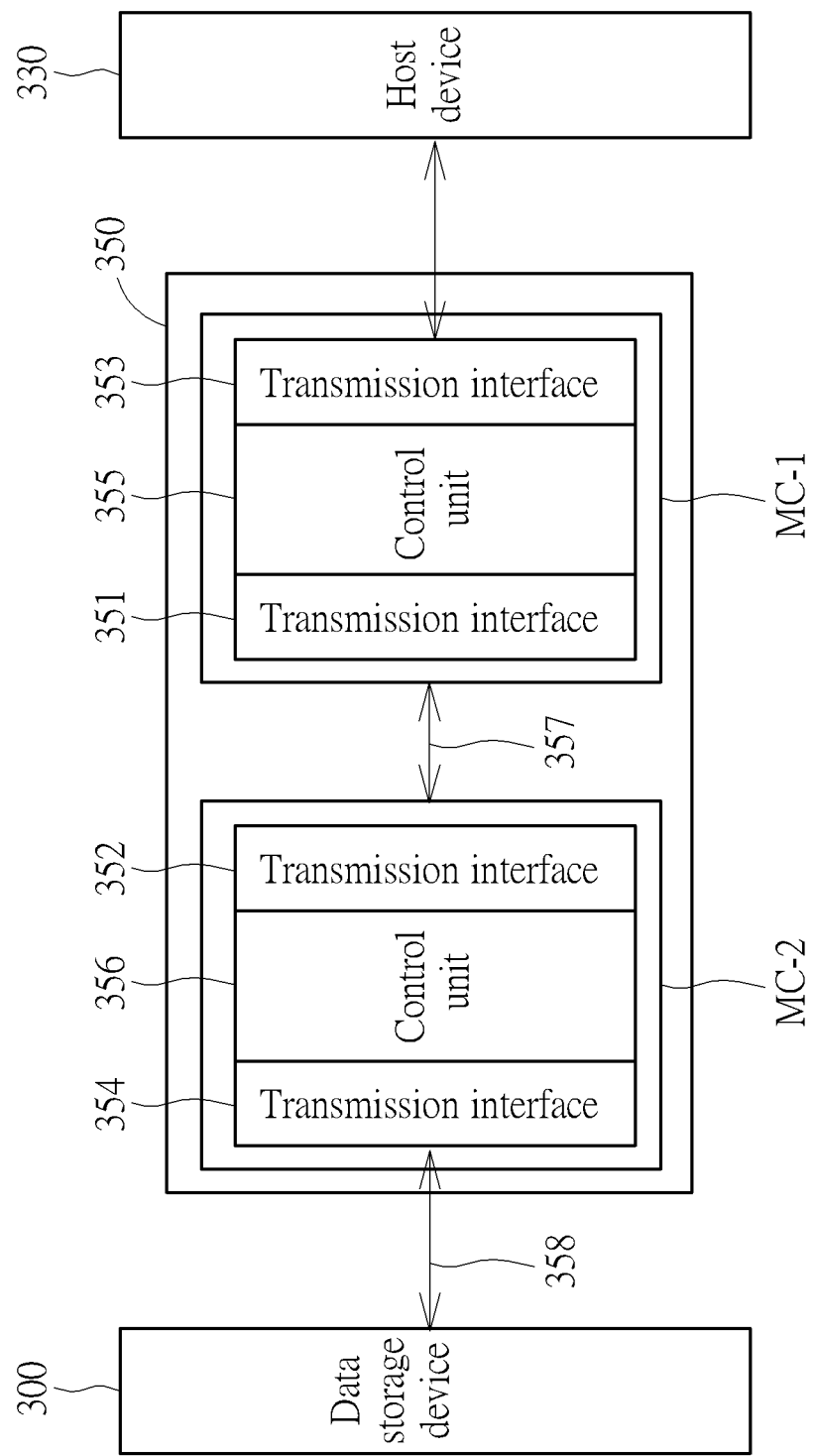
FIG. 3 is an exemplary block diagram of a data storage system according to an embodiment of the invention.

FIG. 3 is an exemplary block diagram of a data storage system according to an embodiment of the invention. The data storage system may at least comprise a data storage device 300 and a bridge device 350. The bridge device 350 may be coupled between the data storage device 300 and the host device 330 for transmitting data and signals between the data storage device 300 and the host device 330, so as to assist the host device 330 to access the data storage device 300.

According to an embodiment of the invention, the bridge device 350 may comprise controllers MC-1 and MC-2. The controller MC-1 may comprise transmission interfaces 351 and 353 and control unit 355. The controller MC-2 may comprise transmission interfaces 352 and 354 and control unit 356. The transmission interfaces 351, 352, 353 and 354 may be respectively configured to communicate with a device or a transmission interface coupled thereto in compliance with a corresponding standard communication protocol. The transmission interface 352 is coupled to the transmission interface 351 for the controller MC-1 and MC-2 to communicate with each other through the transmission interfaces 351 and 352. The transmission interface 353 is configured to communicate with the host device 330 and the transmission interface 354 is configured to communicate with the data storage device 300. The control units 355 and 356 may be configured to execute built-in program codes, thereby making the controllers MC-1 and MC-2 have corresponding functions, and the control units 355 and 356 may be respectively configured to control transmissions and receptions of the signals and packets between the two transmission interfaces 351 and 353 and between the two transmission interfaces 352 and 354, process the received signals and packets or the signals and packets to be transmitted in compliance with the corresponding standard communication protocol, and may be further configured to perform and control format conversion of the signals and the packets, so that the signals and packets are transmitted in correct data format through the corresponding transmission interfaces.

The bridge device 350 may further comprise a bus 357. The bus 357 is coupled between the controllers MC-1 and MC-2 for connecting the transmission interfaces 351 and 352 and making the controllers MC-1 and MC-2 to connect and communicate with each other through the transmission interfaces 351 and 352 and transmit signals and packets through the bus 357. For example, transmitting control signals, command signals and data packets.

According to an embodiment of the invention, the transmission interfaces 351 and 352 may be flash memory interfaces. As an example, the transmission interfaces 351 and 352 may be NAND flash memory interfaces. In addition, according to an embodiment of the invention, the controller MC-1 and MC-2 may both be a memory controller, such as the proposed memory controller 110 or 210 as discussed above. In an embodiment of the invention, the control units 355 and 356 may be implemented as the control unit 115. That is, the control units 355 and 356 may respectively comprise a microprocessor, a ROM, a buffer memory as shown in FIG. 1, for performing corresponding signal processing in compliance with the corresponding standard communication protocol.

According to an embodiment of the invention, the transmission interface 353 may be a Peripheral Component Interconnect Express (PCIe) interface or a Universal Serial Bus (USB) interface. The controller MC-1 may communicate with the host device 330 through the transmission interface 353 in compliance with the corresponding PCIe or the USB protocol. In addition, according to an embodiment of the invention, when the data storage device 300 is implemented as a UFS device, the transmission interface 354 may be a UFS interface and the controller MC-2 may communicate with the data storage device 300 through the transmission interface 354 in compliance with the corresponding UFS protocol, so as to access the data storage device 300.

In an embodiment of the invention, the data storage device 300 may be implemented as the data storage device 100 or 200. That is, the data storage device 300 may comprise a memory device and a memory controller as shown in FIG. 1 and FIG. 2, wherein the memory controller comprised in the data storage device 300 may be coupled to the controller MC-2 of the bridge device 350. For example, the memory controller of the data storage device 300 may be coupled to the memory controller MC-2 through the corresponding bus 358.

To be more specific, when the data storage device 300 is implemented as a UFS device, the host interface or the UFS interface comprised in the memory controller of the data storage device 300 may be coupled to the transmission interface 354 of the memory controller MC-2 through the corresponding bus, and in this embodiment, the transmission interface may also be a UFS interface to make the controller MC-2 to communicate with the memory controller of the data storage device 300 through the corresponding UFS interface.

Therefore, according to an embodiment of the invention, the data storage system may comprise at least three controllers, including the controllers MC-1 and MC-2 (hereinafter also referred to as the first controller and the second controller) disposed in the bridge device 350 and the memory controller (also referred to as a third controller hereinafter) disposed in the data storage device. In the embodiment of the invention, the first controller, the second controller and the third controller are all memory controllers. In addition, according to an embodiment of the invention, the second controller and the third controller may be selected as the same memory controller. For example, the second controller and the third controller may be the same type of controller chip (e.g. the controller chips having the same product number or serial number), or the second controller and the third controller may be identical (that is, having the same hardware, software and/or firmware design), or the second controller and the third controller may both be a UFS memory controller, but they may be the same or different types of UFS memory controller (e.g. the UFS memory controller chips having the same product number or serial number or having different product numbers or serial numbers) and the first controller may be an SSD memory controller. In other words, in some embodiments of the invention, the bridge device 350 may be equipped with the same memory controller as the data storage device 300, wherein the host interfaces of the two memory controllers (or, when the data storage device 300 is implemented as a UFS device, they may be UFS interfaces) may be connected to each other through corresponding bus, so that the second controller in the bridge device 350 and the third controller in the data storage device 300 may communicate through these two interfaces.

It should be noted that the aforementioned implementations are only a portion of a variety of implementations to implement the invention, and the invention should not be limited thereto. In other embodiments of the invention, the second controller and the third controller may also be selected as different memory controllers.

According to an embodiment of the invention, the second controller may be configured to operate in a host mode, and the third controller may be configured to operate in a device mode. Thus, in embodiments where the second controller and the third controller are both memory controllers or the second controller and the third controller are the same memory controller, the second controller is the one that operates in the host mode, and the third controller is the one that operates in the device mode.

According to an embodiment of the invention, the memory controller may be equipped with hardware devices and corresponding firmware and software structures for performing host mode operations, and may be also equipped with hardware devices and corresponding firmware and software structures for performing device mode operations. In this manner, in the embodiments of the invention, by properly configuring the corresponding operation mode, the same memory controller may be used in both the bridge device and the data storage device at the same time.

According to an embodiment of the invention, the memory controller may be configured to operate in the device mode or the host mode by means of software or hardware. For example, the memory controller may comprise a register for storing the setting value regarding the operation mode. By executing the corresponding software program codes, such as the aforementioned ISP code, the control unit of the memory controller may set the setting value stored in the register. When the setting value stored in the register is set to a first value, the control unit may operate in a host mode, thereby configuring the memory controller to operate in the host mode. When the setting value stored in the register is set as a second value, the control unit may operate in a device mode, thereby configuring the memory controller to operate in the device mode. For another example, the memory controller may comprise a setting pin, for example, a general-purpose input/output (GPIO) pin, and the memory controller may determine which mode to operate in according to a value of the setting pin. When the setting pin is set to a first value, the control unit may operate in a host mode, thereby configuring the memory controller to operate in the host mode. When the setting pin is set to a second value or is not set, the control unit may operate in a device mode, thereby configuring the memory controller to operate in the device mode.

According to an embodiment of the invention, when the memory controller and/or the control unit thereof is configured to operate in host mode, the transmission interface thereof, such as the aforementioned flash memory interface, operates in a slave mode, and when the memory controller and/or the control unit thereof is configured to operate in device mode, transmission interface thereof operates in a master mode.

Continuing the previous embodiment, in an embodiment of the invention, the first controller may be configured to operate in the device mode, the second controller may be configured to operate in the host mode, and the third controller may be configured to operate in the device mode. Under such configuration, the transmission interface 351 may operate in the master mode, the transmission interface 352 may operate in the slave mode, and the transmission interface (e.g. the aforementioned flash memory interface 114 or flash memory interface 214) configured inside the memory controller (the third controller) of the data storage device may operate in the master mode.

According to an embodiment of the invention, when the memory controller operates in the host mode, the control unit of the memory controller may be a Host Controller Interface (HCI) for mastering the overall communication protocol of the memory controller. For example, when the memory controller operates in the host mode, the control unit of the memory controller may actively set the corresponding register, and the hardware devices in the memory controller for performing the operation in the host mode and the corresponding firmware and software structure may operate according to the setting value of the register, so that the data to be transmitted through each transmission interface will have the format that conforms to the corresponding communication protocol. In this manner, each transmission interface may directly transmit signals and packets having correct data format, and may correctly interpret the content of the received signals and packets as well. When the memory controller operates in the device mode, the hardware devices in the memory controller for performing the operation in the device mode and the corresponding firmware and software structure may be configured to perform the corresponding communication protocol. As an example, the control unit and the associated components may receive and process signals and packets in compliance with the corresponding standard communication protocol.

Figure 4:
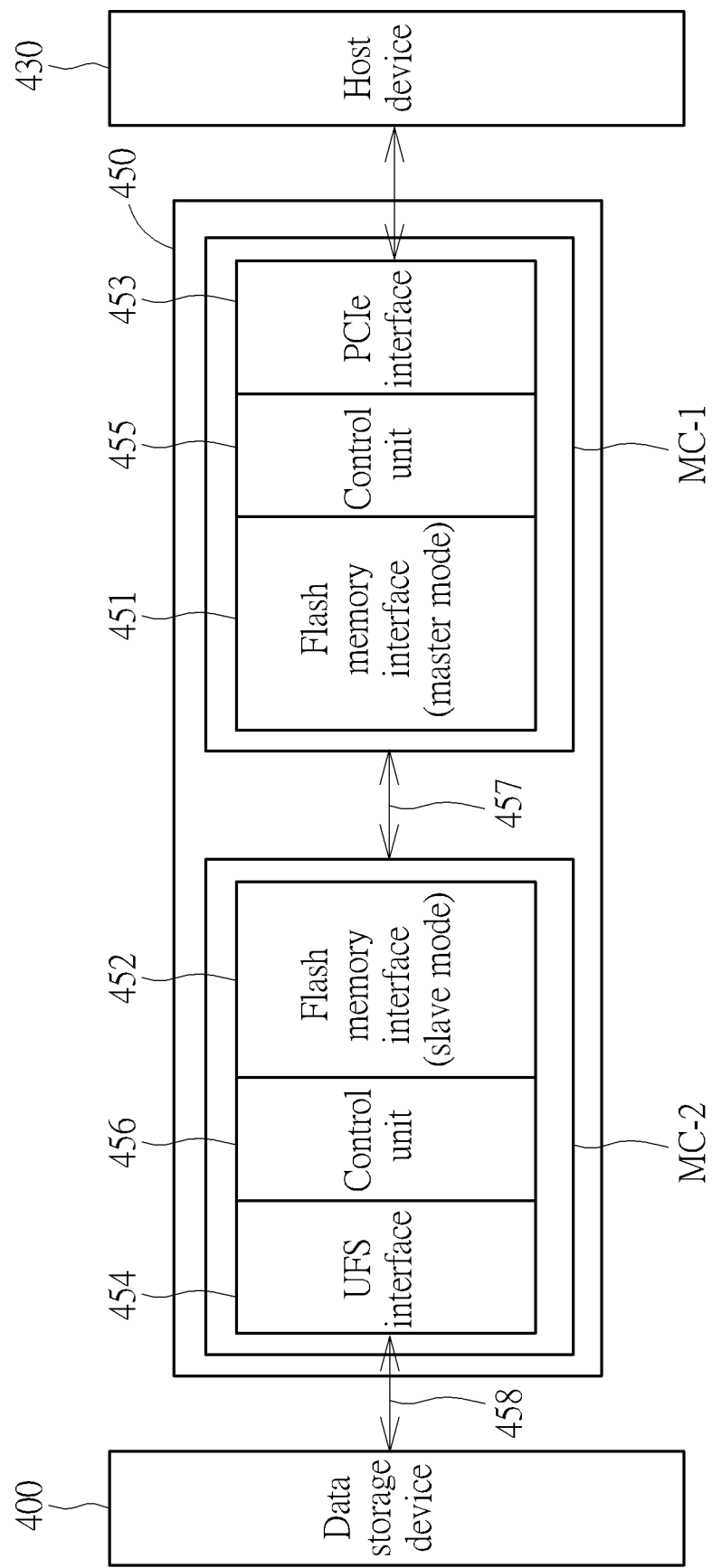
FIG. 4 is a schematic diagram showing an implementation of the data storage system according to an embodiment of the invention.

FIG. 4 is a schematic diagram showing an implementation of the data storage system according to an embodiment of the invention. The data storage system may at least comprise a data storage device 400 and a bridge device 450. The bridge device 450 may be coupled between the data storage device 400 and the host device 430 for transferring data and signals between the data storage device 400 and the host device 430, assisting the host device 430 to access the data storage device 400.

The bridge device 450 may comprise controllers MC-1 and MC-2. In this embodiment, the controller MC-1 may be a Non-Volatile Memory Express (NVMe) controller, the controller MC-2 may be a UFS memory controller, and the data storage device 400 may be a UFS device. The controller MC-1 may comprise a flash memory interface 451 operating in a master mode, a PCIe interface 453, and a control unit 455. The controller MC-2 may include comprise flash memory interface 452 operating in slave mode, a UFS interface 454, and a control unit 456. The data storage device 400 may comprise a UFS memory controller and a memory device as described above.

The flash memory interface 451 and the flash memory interface 452 may be coupled to each other through the bus 457, and the UFS interface 454 and the UFS interface of the UFS memory controller in the data storage device 400 may be coupled to each other through the bus 458.

In this embodiment, the controller MC-1 may be configured to operate in device mode, the controller MC-2 may be configured to operate in host mode, and the UFS memory controller in the data storage device 400 may be configured to operate in device mode. The control units 455 and 456 may be configured to execute built-in program codes, thereby making the controllers MC-1 and MC-2 have corresponding functions, and the control units 455 and 456 may be respectively configured to control transmissions and receptions of the signals and packets between the two transmission interfaces 451 and 453 and between the two transmission interfaces 452 and 454, process the received signals and packets or the signals and packets to be transmitted in compliance with the corresponding standard communication protocol, perform and control format conversion of the signals and the packets, so that the signals and packets are transmitted in correct data format through the corresponding transmission interface.

According to an embodiment of the invention, the controller MC-2 and the UFS memory controller in the data storage device 400 may be the same UFS memory controller, and the UFS memory controller may be equipped with hardware devices and corresponding firmware and software structures for performing host mode operations, and may be also equipped with hardware devices and corresponding firmware and software structures for performing device mode operations. In this manner, in the embodiment of the invention, the same UFS memory controller may be used in the bridge device and the data storage device at the same time by configuring the corresponding operation mode, so as to realize the proposed data storage system.

In this embodiment, the controller MC-1 may communicate with the host device 430 through the PCIe interface 453 in compliance with the NVMe protocol. When the host device 430 wants to access the data storage device 400 through the bridge device 450, the host device 430 sends commands or data to the controller MC-1 in compliance with the NVMe protocol. The controller MC-1 may convert the command or data into a data format that is recognizable for the controller MC-2. For example, in compliance with the corresponding communication protocol, the data is packaged into a packet and then the packet is sent to the controller MC-2 through the flash memory interfaces 451 and 452. Next, the controller MC-2 transmits the packet to the data storage device 400 through the UFS interface 454 in compliance with the UFS protocol.

Figure 5:
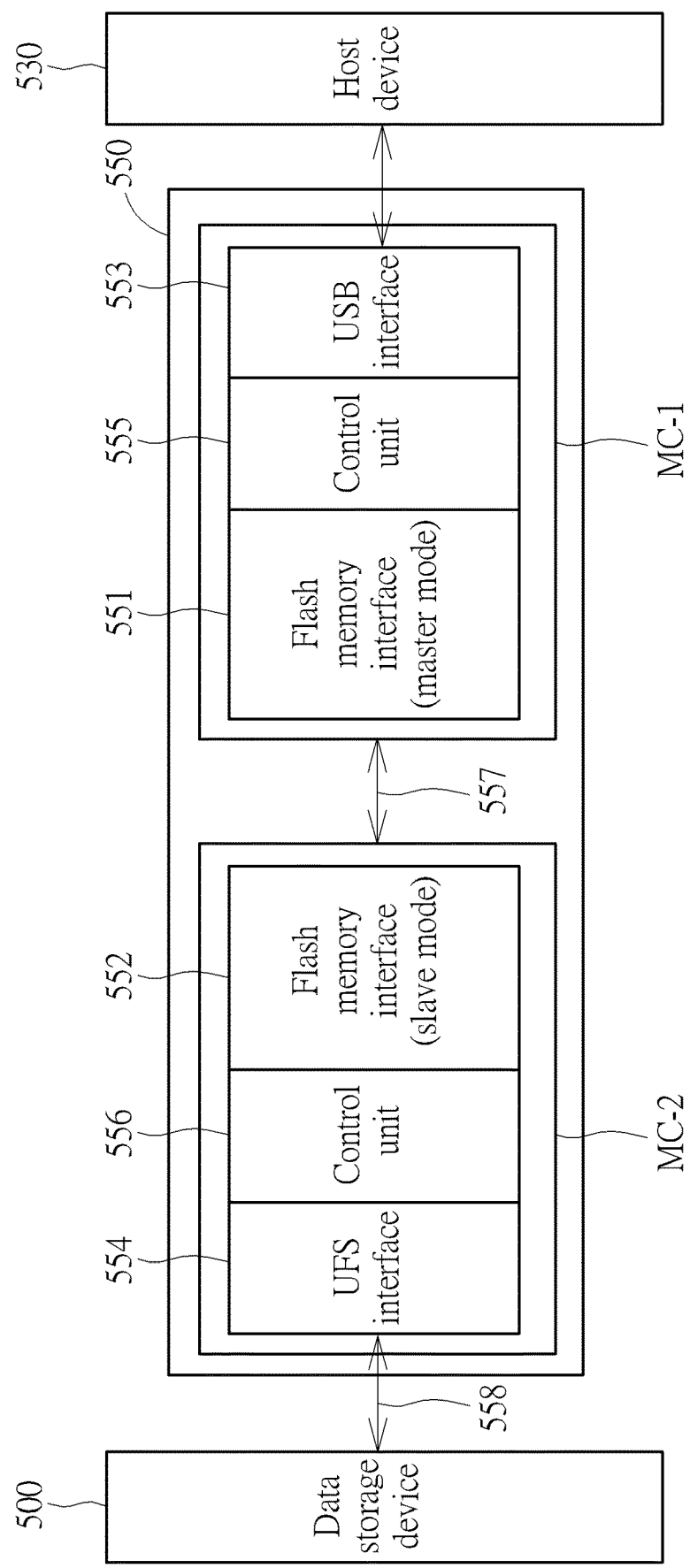
FIG. 5 is schematic diagram showing another implementation of the data storage system according to an embodiment of the invention.

FIG. 5 is schematic diagram showing another implementation of the data storage system according to an embodiment of the invention. The data storage system may at least comprise a data storage device 500 and a bridge device 550. The bridge device 550 may be coupled between the data storage device 500 and the host device 530 for transferring data and signals between the data storage device 500 and the host device 530, assisting the host device 530 to access the data storage device 500.

The bridge device 550 may comprise controllers MC-1 and MC-2. In this embodiment, the controller MC-1 may be a USB controller, the controller MC-2 may be a UFS memory controller, and the data storage device 500 may be a UFS device. The controller MC-1 may comprise a flash memory interface 551 operating in a master mode, a USB interface 553, and a control unit 555. The controller MC-2 may comprise a flash memory interface 552 operating in slave mode, a UFS interface 554, and a control unit 556. The data storage device 500 may include a UFS memory controller and a memory device as described above.

The flash memory interface 551 and the flash memory interface 552 may be coupled to each other through the bus 557, and the UFS interface 554 and the UFS interface of the UFS memory controller comprised in the data storage device 500 may be coupled to each other through the bus 558.

In this embodiment, the controller MC-1 may be configured to operate in device mode, the controller MC-2 may be configured to operate in host mode, and the UFS memory controller inside the data storage device 500 may be configured to operate in device mode. The control units 555 and 556 may be configured to execute built-in program codes, thereby making the controllers MC-1 and MC-2 have corresponding functions, and the control units 355 and 356 may be respectively configured to control transmissions and receptions of the signals and packets between the two transmission interfaces 551 and 553 and between the two transmission interfaces 552 and 554, process the received signals and packets or the signals and packets to be transmitted in compliance with the corresponding standard communication protocol, perform and control format conversion of the signals and the packets, so that the signals and packets are transmitted in correct data format through the corresponding transmission interface.

According to an embodiment of the invention, the controller MC-2 and the UFS memory controller comprised in the data storage device 500 may be the same UFS memory controller, and the UFS memory controller may be equipped with hardware devices and corresponding firmware and software structures for performing host mode operations, and may be also equipped with hardware devices and corresponding firmware and software structures for performing device mode operations. In this manner, in the embodiment of the invention, the same UFS memory controller may be used in the bridge device and the data storage device at the same time by configuring the corresponding operation mode, so as to realize the proposed data storage system.

In this embodiment, the controller MC-1 may communicate with the host device 530 through the USB interface 553 in compliance with the USB (Small Computer System Interface (SCSI)) protocol. When the host device 530 wants to access the data storage device 500 through the bridge device 550, the host device 530 sends commands or data to the controller MC-1 in compliance with the USB (SCSI) protocol. The controller MC-1 may convert the command or data into a data format that is recognizable for the controller MC-2. For example, in compliance with the corresponding communication protocol, the data is packaged into a packet and then the packet is sent to the controller MC-2 through the flash memory interfaces 551 and 552. Next, the controller MC-2 transmits the packet to the data storage device 500 through the UFS interface 554 in compliance with the UFS protocol.

In the embodiment of the invention, the two controllers are connected through predetermined transmission interfaces, such as the flash memory interfaces, to form a bridge device. Based on this architecture, the corresponding transmission interfaces are respectively configured to operate in master mode and slave mode, that is, the transmission interfaces respectively comprised in the controllers MC-1 and MC-2 and connected to each other will be configured to operate in different modes, and the packets are transmitted therebetween. In addition, based on this architecture, the bridge device may comprise high-speed transmission interfaces made by different processes or in compliance with different standards, such as the aforementioned UFS interface and PCIe or USB interface, so that the proposed bridge device has backward compatible characteristics. In addition, in the embodiment of the invention, the controllers in the bridge device are respectively configured to operate in the device mode and the host mode, so as to cooperate with each other to complete the bridge operation.

In addition, in the embodiments of the invention, the controller MC-2 comprised in the bridge device and the memory controller comprised in the data storage device may be the same memory controller, or may both have a host interface with the same specification. Therefore, based on this architecture, the host interface inside the bridge device, such as the UFS interface described above, and the UFS interface configured in the memory device will be two transmission interfaces made with the same process or in compliance with the same standard. In this way, the problem that two devices cannot be compatible with each other due to different UFS versions as discussed above is effectively solved, and under this architecture, only one memory controller circuit or chip has to be designed and manufactured (tape out), since the same memory controller can be applied to the two devices. The cost in manufacturing the memory controller can also be effectively saved.

It should be noted that, in some embodiments of the invention, the controllers MC-1 and MC-2 may respectively be two different controller chips, and in other embodiments of the invention, the controllers MC-1 and MC-2 may also be integrated into one chip, that is, the proposed bridge device may be formed by combining two independent controller chips, or may be a single chip comprising two controller modules. The invention is not limited to any specific ways of implementation.

In addition, it is to be noted that although flash memory device and UFS device are utilized as the examples in the above embodiments to describe the concept of the invention, the invention should not be limited thereto. In other embodiments of the invention, the memory device may also be other types of memory, and the data storage device may also be implemented as a data storage device supporting other standard communication protocols. Likewise, although the NVMe controller and the USB controller are utilized as the examples in the above embodiments to describe the concept of the invention, the invention should not be limited thereto. In other embodiments of the invention, the controller in the bridge device may also be other types of controllers.

In the embodiments of the invention, the proposed bridge device is able to effectively combine high-speed transmission interfaces made by different processes or in compliance with different standards, so as to assist the host device to access the data storage device and make the bridge device backward compatible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A bridge device, comprising:
a first controller, comprising a first transmission interface operating in a master mode, a third transmission interface configured to communicate with a host device coupled externally to the bridge device according to a first protocol, and a control unit configured to control transmission and reception of signals and packets between the first transmission interface and the third transmission interface and perform format conversion of the signals and the packets within the bridge device; and
a second controller, coupled to the first controller and comprising a second transmission interface operating in a slave mode and coupled to the first transmission interface, a fourth transmission interface configured to communicate with a data storage device coupled externally to the bridge device according to a second protocol different from the first protocol, and a control unit configured to control transmission and reception of signals and packets between the second transmission interface and the fourth transmission interface and perform format conversion of the signals and the packets within the bridge device;
wherein the first transmission interface and the second transmission interface are both a flash memory interface, and the bridge device utilizes the control unit of the first controller to set the first transmission interface to operate in the master mode and the bridge device utilizes the control unit of the second controller to set the second transmission interface to operate in the slave mode,
wherein the first protocol is UFS 3.1 and the second protocol is UFS 3.0.

2. The bridge device as claimed in claim 1, wherein the first controller and the second controller are memory controllers.

3. The bridge device as claimed in claim 2, wherein the fourth transmission interface is a Universal Flash Storage (UFS) interface.

4. The bridge device as claimed in claim 1, further comprising:
   a bus, coupled between the first controller and the second controller for connecting the first transmission interface and the second transmission interface.

5. A data storage system, comprising:
   a bridge device, comprising:
     a first controller, comprising a first transmission interface operating in a master mode, a third transmission interface configured to communicate with a host device coupled externally to the bridge device according to a first protocol, and a control unit configured to control transmission and reception of signals and packets between the first transmission interface and the third transmission interface and perform format conversion of the signals and the packets within the bridge device; and
     a second controller, coupled to the first controller, and comprising a second transmission interface operating in a slave mode and coupled to the first transmission interface, a fourth transmission interface configured to communicate with a data storage device coupled externally to the bridge device according to a second protocol different from the first protocol, and a control unit configured to control transmission and reception of signals and packets between the second transmission interface and the fourth transmission interface and perform format conversion of the signals and the packets within the bridge device; and
   the data storage device, comprising:
     a third controller, comprising an interface operating in a master mode coupled to the fourth transmission interface;
   wherein the first transmission interface and the second transmission interface are both a flash memory interface, the first controller is a memory controller operating in a device mode, the bridge device utilizes the control unit of the first controller to set the first transmission interface to operate in the master mode, the second controller is a memory controller operating in a host mode, the bridge device utilizes the control unit of the second controller to set the second transmission interface to operate in the slave mode, the third controller is a memory controller operating in a device mode, and the second memory controller and the third memory controller are of a same standard;
   wherein the first protocol is UFS 3.1 and the second protocol is UFS 3.0.

6. The data storage system as claimed in claim 5, wherein the fourth transmission interface is a Universal Flash Storage (UFS) interface.

* * * * *